US011234279B2

(12) United States Patent
Garg

(10) Patent No.: US 11,234,279 B2
(45) Date of Patent: Jan. 25, 2022

(54) METHOD OF AND SYSTEM FOR FEMTOCELL IMPLEMENTATION IN EVOLVED PACKET CORE

(71) Applicant: MICROSOFT TECHNOLGY LICENSING, LLC, Redmond, WA (US)

(72) Inventor: Deepak Garg, Nashua, NH (US)

(73) Assignee: ;MICROSOFI TECHNOLGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/627,272

(22) Filed: Feb. 20, 2015

(65) Prior Publication Data

US 2015/0304859 A1  Oct. 22, 2015

Related U.S. Application Data

(60) Provisional application No. 61/981,028, filed on Apr. 17, 2014.

(51) Int. Cl.
*H04W 4/00* (2018.01)
*H04W 76/12* (2018.01)
(Continued)

(52) U.S. Cl.
CPC ......... *H04W 76/12* (2018.02); *H04W 84/005* (2013.01); *H04W 84/045* (2013.01); *H04W 88/16* (2013.01)

(58) Field of Classification Search
CPC .... H04W 88/16; H04W 84/045; H04W 16/18
See application file for complete search history.

(56) References Cited

U.S. PATENT DOCUMENTS

2009/0109933 A1* 4/2009 Murasawa ............ H04L 63/029
370/335
2009/0156213 A1 6/2009 Spinelli et al.
(Continued)

FOREIGN PATENT DOCUMENTS

CN  102986262 A  3/2013
CN  103227975 A  7/2013
(Continued)

OTHER PUBLICATIONS

International Search Report and Written Opinion issued by the U.S. Patent and Trademark Office as International Searching Authority for International Application No. PCT/US2015/025947 dated Jul. 13, 2015 (7 pages).
(Continued)

*Primary Examiner* — Abdelillah Elmejjarmi
(74) *Attorney, Agent, or Firm* — Ray Quinney & Nebeker P.C; James Bullough

(57) ABSTRACT

A method of and system for femtocell implementation in evolved packet core is disclosed. A system for a mobile wireless device to communicate with a data network via a small cell radio access network using a cellular backhaul includes a hybrid gateway node communicating with an eNodeB element via a first digital communication interface and the hybrid gateway node communicating with a packet data network via a second digital interface. The hybrid gateway node includes a processor and memory configured to provide a backhaul serving gateway functionality, a backhaul packet data network gateway functionality, a serving gateway functionality to the mobile device, and a packet data network gateway functionality to the mobile device.

16 Claims, 8 Drawing Sheets

(51) Int. Cl.
*H04W 84/00* (2009.01)
*H04W 88/16* (2009.01)
*H04W 84/04* (2009.01)

(56) References Cited

U.S. PATENT DOCUMENTS

| | | | |
|---|---|---|---|
| 2010/0128708 A1 | 5/2010 | Liu et al. | |
| 2011/0075675 A1* | 3/2011 | Koodli | H04L 12/14 370/401 |
| 2012/0287854 A1* | 11/2012 | Xie | H04W 48/08 370/328 |
| 2013/0155847 A1* | 6/2013 | Li | H04W 24/04 370/225 |
| 2013/0273885 A1 | 10/2013 | Huber et al. | |
| 2013/0279430 A1 | 10/2013 | Damnjanovic et al. | |
| 2014/0016529 A1 | 1/2014 | Singh et al. | |
| 2014/0349659 A1* | 11/2014 | Ishii | H04W 76/10 455/444 |
| 2015/0304859 A1 | 10/2015 | Garg | |

FOREIGN PATENT DOCUMENTS

| | | |
|---|---|---|
| JP | 2011-524654 A | 9/2011 |
| WO | WO-2009132824 A2 | 11/2009 |
| WO | WO-2013070244 A1 | 5/2013 |

OTHER PUBLICATIONS

Extended European Search Report issued in EP15779708.5, dated Nov. 14, 2017 (8 pages).
Japanese Office Action issued in JP 2016-563029, dated Feb. 22, 2019 (4 pages).
"Office Action Issued in Indian Patent Application No. 201637036143", dated May 22, 2020, 6 Pages.
"First Office Action and Search Report Issued in Chinese Patent Application No. 201580031989.5", dated Jun. 5, 2019, 16 Pages.
"Second Office Action Issued in Chinese Patent Application No. 201580031989.5", dated Mar. 11, 2020, 17 Pages.

* cited by examiner

METHOD OF AND SYSTEM FOR FEMTOCELL IMPLEMENTATION IN EVOLVED PACKET CORE

CROSS-REFERENCE TO RELATED APPLICATIONS

This application claims the benefit under 35 U.S.C. § 119(e) to U.S. Provisional Patent Application No. 61/981,028 entitled Method of and System for Femto Cell Implementation in Evolved Packet Core, filed on Apr. 17, 2014, the content of which is incorporated by reference herein.

BACKGROUND OF THE INVENTION

Field of Invention

The invention general relates to implementations of a femtocell in evolved packet core, and, more specifically, to improving performance and reducing latency in femtocell implementations involving the use of cellular access as a backhaul mechanism.

Description of Related Art and Context of the Invention

Evolved Packet Core (EPC) was first introduced by 3GPP in Release 8 of the standard and is the core network of the Long Term Evolution (LTE) system. It was decided to have a "flat architecture". The approach was to handle the payload (the data traffic) efficiently from performance and costs perspective. Few network nodes are involved in the handling of the traffic and protocol conversion is avoided. It was also decided to separate the user data (also known as the user plane) and the signaling (also known as the control plane) to make the scaling independent.

FIG. 1 illustrates an example of an Evolved Packet System (EPS) architecture 100. The system architecture 100 shows a User Equipment (UE) 105 connected to the EPC over an Evolved UMTS Terrestrial Radio Access Network (E-UTRAN), which is the air interface for the LTE implementation. An Evolved NodeB (eNodeB) 110 is the base station for LTE radio. In FIG. 1, the EPC is composed of three network elements: the Serving Gateway (SGW) 115, the Packet Data Network Gateway (PDN GW or PGW) 120 and the Mobility Management Entity (MME) 125. The EPC is connected to the external networks (which can include internet or IMS or private networks).

The MME 125 deals with the control plane. It handles the signaling related to mobility and security for E-UTRAN access, via Sl-MME 130 and Sl-C 135 interfaces. The MME 125 is responsible for the tracking and the paging of UE 105 in idle-mode. It is the termination point of the Non-Access Stratum (NAS).

The gateways, SGW 115 and PGW 120, deal with the user plane. They transport the IP data traffic between the UE 105 and the external networks, via Sl-U interfaces 140. The SGW 115 is the point of interconnect between the radio-side and the EPC. As its name indicates, this gateway serves the UE 105 by routing the incoming and outgoing IP packets. It is the anchor point for the intra-LTE mobility (i.e., in case of handover between eNodeBs) and between LTE and other 3GPP accesses. It is logically connected to the other gateway, the PGW 120.

The PGW 120 is the point of interconnect between the EPC and the external IP networks. These networks are called PDN (Packet Data Network), hence the name of the gateway. The PGW 120 routes packets to and from the PDNs. The PGW 120 also performs various functions such as IP address/IP prefix allocation or policy control and charging. Even though the 3GPP specifies SGW 115 and PGW 120 logical element separately, in practice, they may be implemented in the same single physical entity.

A femtocell is a small, relatively low-power cellular base station, typically designed for use in a home or small business, and is a subset of what are known as small cell implementations. It typically connects to the service provider's network via broadband (such as DSL or cable). It typically supports two to four active mobile phones in a residential setting, and eight to 16 active mobile phones in enterprise settings. Femtocells operate on the same licensed spectrum that is used in macro and micro cells but only have a range of tens of meters, to cover the area within the home or an enterprise. A femtocell allows Mobile Network Operators (MNO) to extend service coverage indoors or at the cell edge, especially where access would otherwise be limited or unavailable. For a mobile operator, the attractions of a femtocell are improvements to both coverage and capacity. Consumers benefit from improved coverage and potentially better voice quality and battery life.

FIG. 2 shows an illustrative implementation of a femtocell 200. In 3GPP terminology, a Home Node B (HNB) is a 3G femtocell. A Home eNode B (HeNB) is an LTE femtocell. The communication between an HeNB 205, though which UE 210 communicates, and the network HeNB/Femto Gateway (FemtoGW) 215, when it exists, or to an MME 220, is secured by a mandatory Security Gateway (SeGW) function/logical entity 225. Since in most deployments, the HeNB 205 is providing access to the MNO via backhauling through broadband (cable/xDSL) 230, the SeGW 225 provides security to make the environment trusted. The SeGW 225 may be implemented as a separate physical entity or a co-located with FemtoGW 215. The interface between the HeNB 205 and the FemtoGW 215 is Sl and carries Sl-MME traffic for control traffic and Sl-U traffic for bearer traffic.

SUMMARY OF THE INVENTION

In an embodiment of the invention, a method of and system for femtocell implementation in evolved packet core is disclosed.

In another embodiment of the invention, a system for a mobile wireless device to communicate with a data network via a small cell radio access network using a cellular backhaul includes a first digital communication interface for communicating with an Evolved Node B (eNodeB) element of the small cell radio access network, a second digital communication interface for communicating with a packet data network, and a hybrid gateway node communicating with the eNodeB element via the first digital communication interface and the hybrid gateway node communicating with the packet data network via the second digital interface. The hybrid gateway node includes a processor and memory configured to provide a backhaul serving gateway functionality, provide a backhaul packet data network gateway functionality, provide a serving gateway functionality to the mobile device, and provide a packet data network gateway functionality to the mobile device.

In a further embodiment of the invention, the system includes a Mobility Management Entity (MME) in communication with the hybrid gateway node.

In yet another embodiment of the invention, the MME is a hybrid MME that includes a processor and memory configured to provide a backhaul MME functionality and an MME functionality to the mobile device.

In still a further embodiment of the invention, the processor and memory of the hybrid MME are configured to scale Stream Control Transmission Protocol associations.

In another embodiment of the invention, the system also include a femto gateway node that exists outside a user equipment traffic path of the small cell radio access network while remaining in an administrative control path of the small cell radio access network.

In another embodiment of the invention, a method of conveying data in a data network via a small cell radio access network using a cellular backhaul includes receiving data from an Evolved Node B (eNodeB) element of the small cell radio access network at a hybrid gateway node. The method also includes processing the data by the hybrid gateway node in accordance with a backhaul serving gateway functionality, processing the data by the hybrid gateway node in accordance with a backhaul packet data network gateway functionality, processing the data by the hybrid gateway node in accordance with a serving gateway functionality for a mobile device communicating with the eNodeB, processing the data by the hybrid gateway node in accordance with a packet data network gateway functionality for the mobile device communicating with the eNodeB, and transmitting the processed data to a packet data network.

In yet another embodiment of the invention, a method of conveying data in a data network via a small cell radio access network using a cellular backhaul includes receiving data from a packet data network. The method also includes processing the data by the hybrid gateway node in accordance with a packet data network gateway functionality for a mobile device in communication with an Evolved Node B (eNodeB) element of the small cell radio access network, processing the data by the hybrid gateway node in accordance with a serving gateway functionality for the mobile device in communication with the eNodeB element of the small cell radio access network, processing the data by the hybrid gateway node in accordance with a backhaul packet data network gateway functionality, processing the data by the hybrid gateway node in accordance with a backhaul serving gateway functionality, and transmitting the processed data to the eNodeB element of the small cell radio access network at a hybrid gateway node.

In a further embodiment of the invention, the method includes exchanging control data between the hybrid gateway node and a Mobility Management Entity (MME) node.

In still another embodiment of the invention, the MME is a hybrid MME, in which the hybrid MME processes the control data in accordance with a backhaul MME functionality and processes the control data in accordance with a MME functionality for the mobile device communicating with the eNodeB.

In yet a further embodiment of the invention, the hybrid MME scales Stream Control Transmission Protocol associations.

In another embodiment of the invention, the method includes routing administrative control traffic to a femto gateway node for processing while bypassing the femto gateway node with user equipment traffic.

Any of the aspects and embodiments set forth herein can be combined with any other aspects of embodiments set forth herein.

BRIEF DESCRIPTION OF THE DRAWINGS

For a more complete understanding of various embodiments of the present invention, reference is now made to the following descriptions taken in connection with the accompanying drawings in which.

DETAILED DESCRIPTION OF THE PREFERRED EMBODIMENTS

Preferred embodiments of the present invention provide architectures for improved small cell (herein called "femtocell") implementations that use a cellular backhaul rather than traditional fixed broadband backhaul. Illustrative implementations of the invention have improved packet latency and increased packet core capacity relative to known cellular backhaul implementations. Situations in which the use of a cellular backhaul rather than a fixed broadband (xDSL, cable) backhaul is more desirable include (1) those times when placement of HeNB result in variations in coverage and capacity increases of femtocells, such as outside of a home or other structure, and (2) use of a femtocell in a mobile environment where fixed broadband coverage is not available (e.g., taxi, bus, or other public/mass transit).

Figure 1:
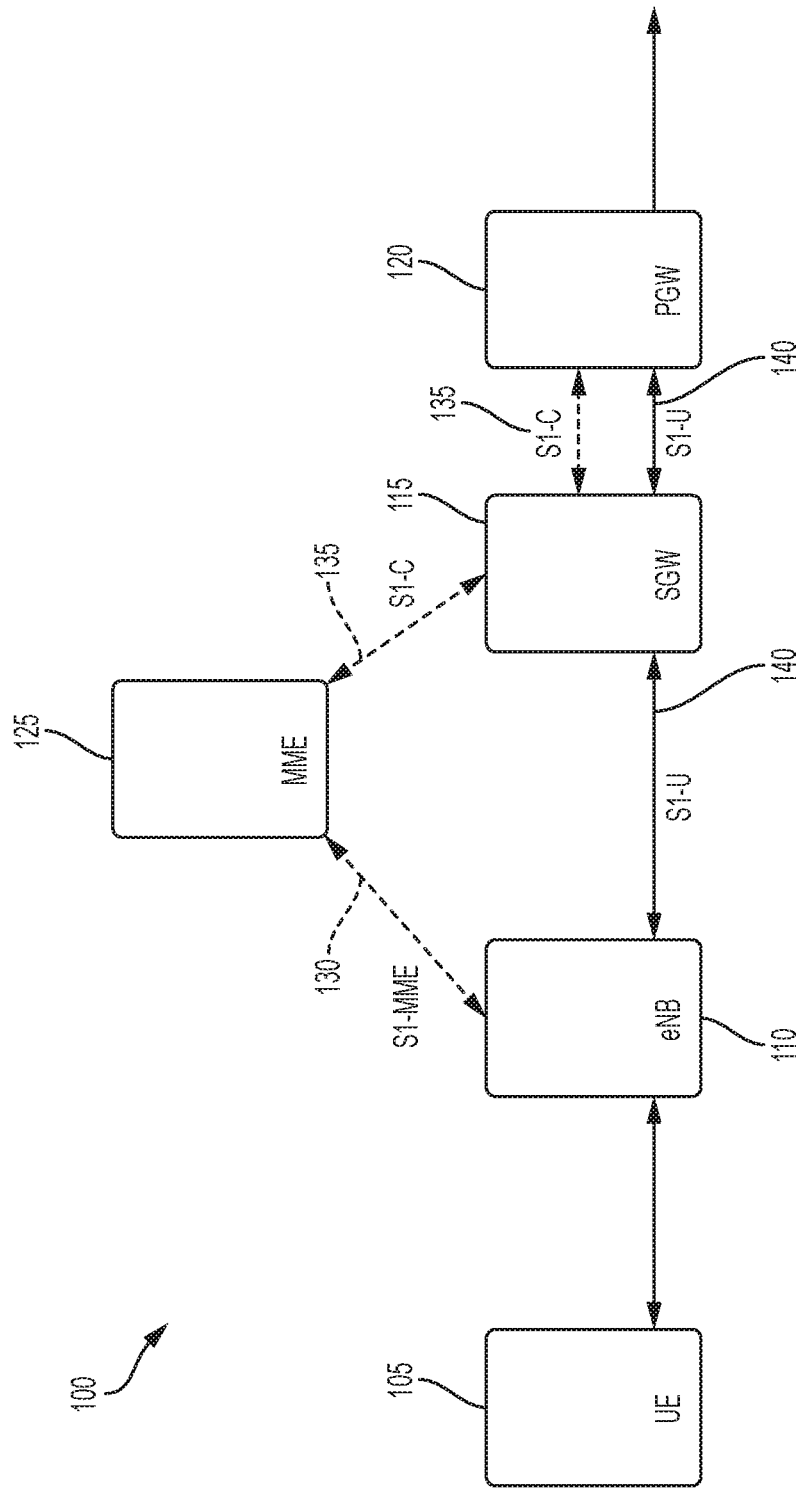
FIG. 1 illustrates an example of an Evolved Packet System (EPS) architecture.
Figure 2:
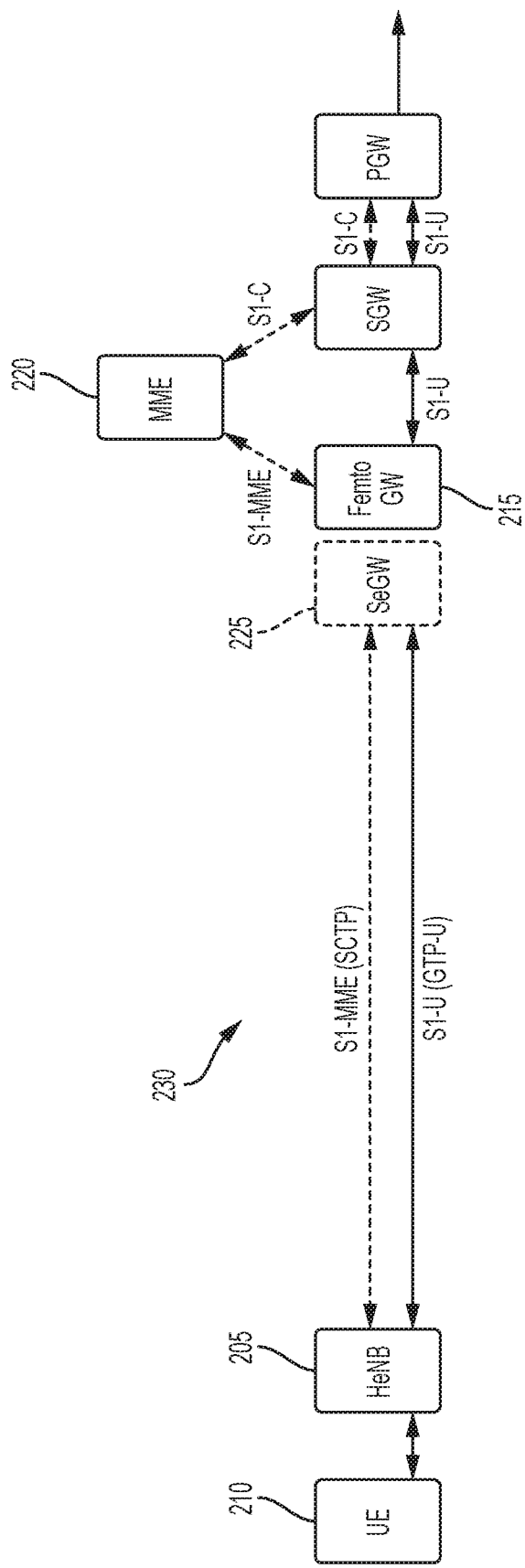
FIG. 2 shows an illustrative implementation of a femtocell.
Figure 3:
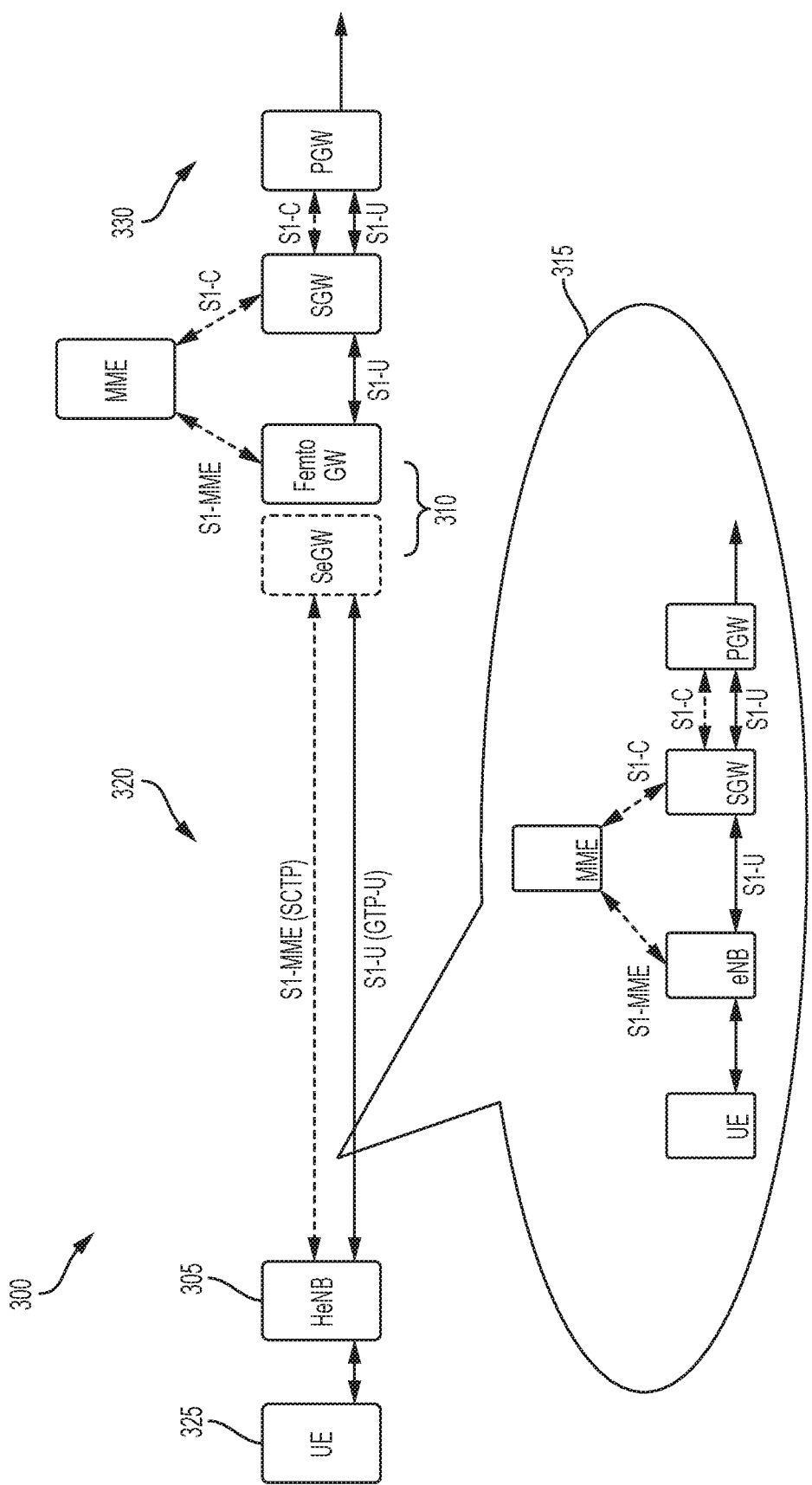
FIG. 3 illustrates a femtocell with cellular backhaul deployment according to an aspect of the invention.

FIG. 3 illustrates a femtocell with cellular backhaul deployment 300 with an HeNB 305 connected to an SeGW/FemtoGW 310 through cellular access 315. As shown, the fixed broadband backhaul 320 between the HeNB 305 and SeGW/FemtoGW 310 is replaced by a cellular access 315. In that case, the HeNB 305 will also act as a LTE-UE ("UE-f" will be used to represent the entity acting as UE in the femtocell), which is used to route packets from UEs 325 (connected to HeNB 305 represented as "UE-c"). In alternative implementations, the HeNB 305 can act as a Wifi-AP (integrated within HeNB 305) and allow devices attached to the Wifi-AP to be connected to a PDN network 330. In such a case, the same general connectivity and routing concepts apply.

Figure 4:
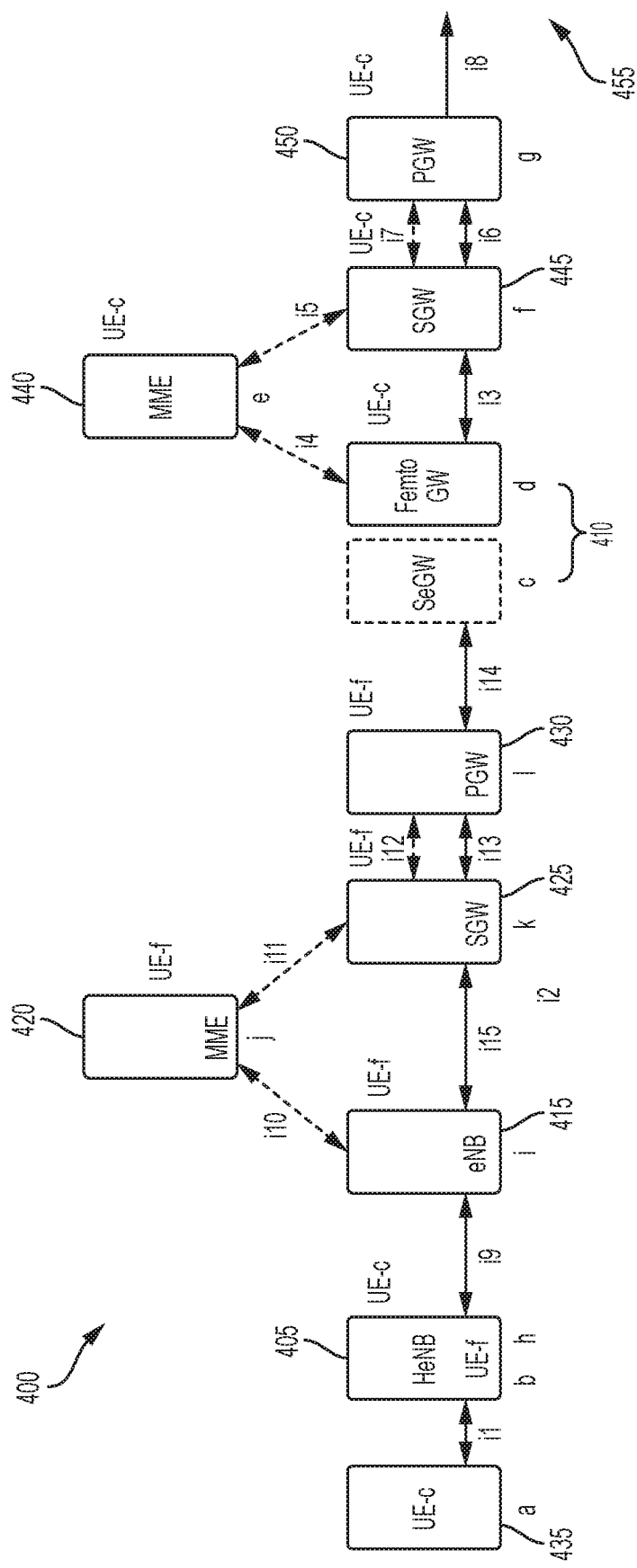
FIG. 4 shows the cellular backhaul integrated into the femtocell implementation according to an aspect of the invention.

FIG. 4 shows the cellular backhaul integrated into the femtocell implementation 400. As mentioned above, the HeNB 405 also acts as a LTE-UE and is represented by UE-f. All communication between the HeNB 405 and the SeGW/FemtoGW 410 goes through this cellular backhaul, which is represented by represented by eNB(i) 415, MME(j) 420, SGW(k) 425 and PGW(l) 430. The eNB (i) 415, MME (j) 420, SGW(k) 425 and PGW(l) 430 have the state context for subscriber UE-f. For UEs 435 attached to HeNB 405, also represented by UE-c, the MME (e) 440, SGW(f) 445, PGW(g) 450, HeNB(b) 405, SeGW(c)/FemtoGW(d) 410 have state context for subscriber UE-c. To get PDN access for subscriber UE-c, the packet core processing has to first go through eNB(j) 415, MME(j) 420, SGW(k) 425 and PGW(1) 430 to reach the SeGW(c)/FemtoGW(d) 410, and then again through SeGW(c)/FemtoGW(d) 410, SGW(f) 445 and PGW(g) 450 to reach the desired PDN network 455.

With reference to the implementation shown in FIG. 4, applicants have recognized that typically the UE-c 435 and UE-f 405 belong to the same MNO (since the femtocell is provided by the same MNO). Thus, the MME(j) 420 is the same entity as MME(e) 440, the SGW (k) 425 is same entity as SGW (f) 445 and PGW (1) 430 is same entity as PGW(g) 450. Hence, the packets (and especially the data plane packets of UE-c) are traversing the packet core elements (SGW represented by SGW (k) and SGW (f) and PGW represented by PGW(j) and PGW(g) twice. Applicants have discovered that such an architecture adds latency to the packets traversing the network and reduces packet core capacity. Given that bearer packets (including IMS signaling) will have to be processed multiple times along to go through the SeGW(c)/FemtoGW(d) 410, considerable signaling and data path latencies for UE-c traffic is introduced.

Figure 5:
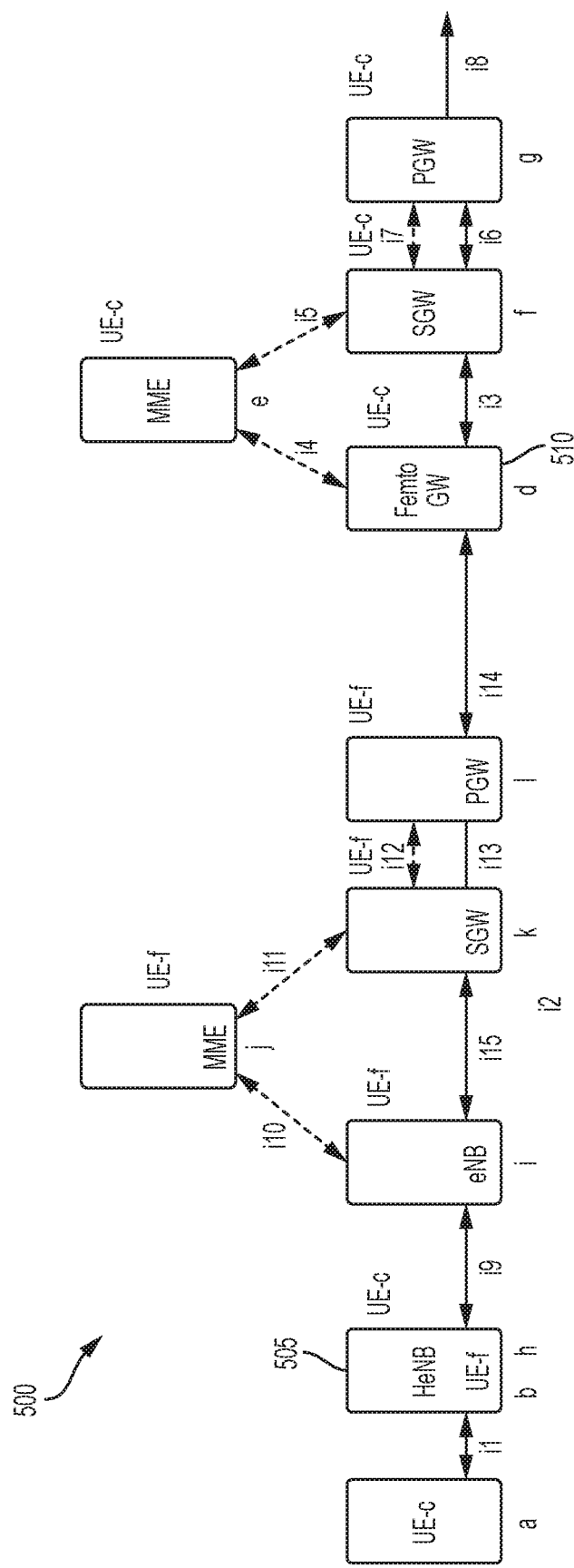
FIG. 5 illustrates an improved femtocell implementation using a cellular backhaul according to an aspect of the invention.

FIG. 5 illustrates an improved femtocell implementation using a cellular backhaul 500. In this implementation, no changes are needed on the FemtoGW or MME entities, and changes on the core packet elements, SGWs and PGWs, are minimized. In this embodiment, the SeGW shown in FIG. 4 is eliminated. The role of the SeGW is to make the communication between the HeNB 505 and FemtoGW 510 secure. In this implementation, the entire HeNB traffic (for all UEs connected to HeNB 505) is going over the data plane of UE-f, which by definition is secure. To achieve this improvement, the IPSec tunnels between HeNB 505 and FemtoGW 510 are disabled as represented in FIG. 5.

Figure 6:
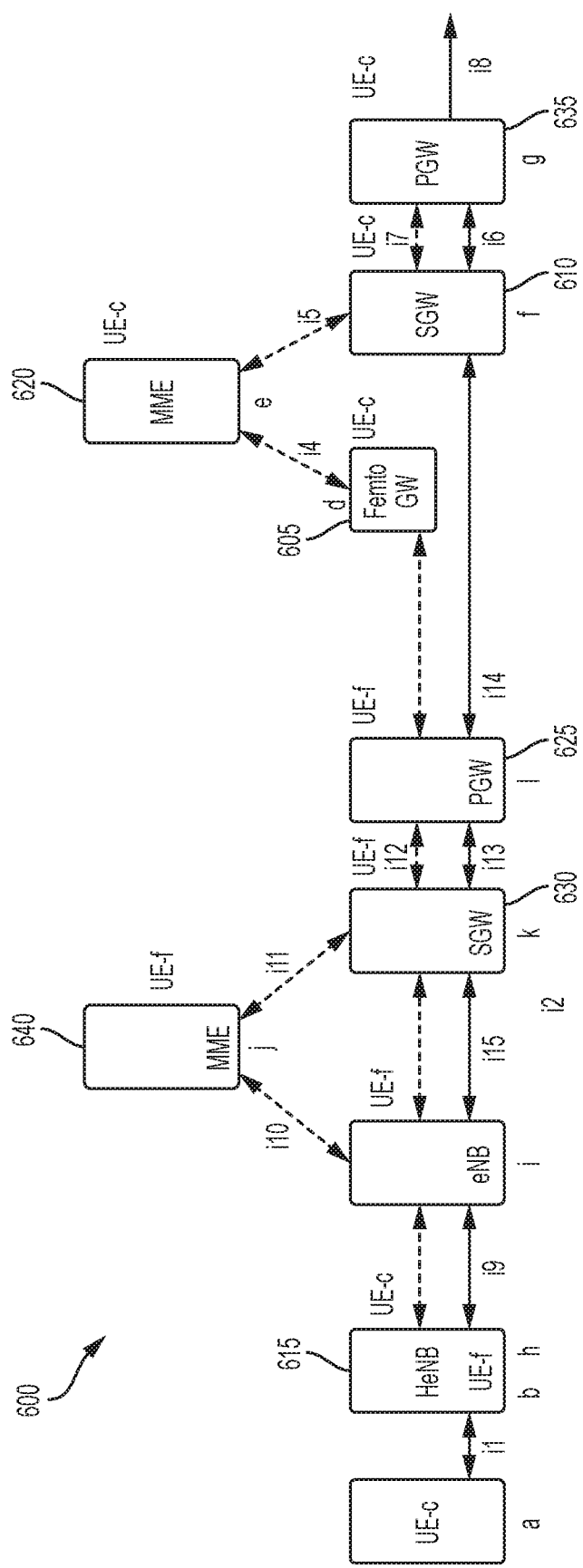
FIG. 6 illustrates a further improved femtocell implementation using a cellular backhaul according to an aspect of the invention.

FIG. 6 illustrates a further improved femtocell implementation using a cellular backhaul 600. In the implementations described above, the HeNB communication to the FemtoGW can be for control, management and data purposes. In such cases, the FemtoGW acts as a concentrator for HeNBs for both control traffic (Sl-MME, shown in dashed lines) and UE traffic (Sl-U, shown in solid lines). Sl-MME traffic is Stream Control Transmission Protocol (SCTP) based, whereas Sl-U traffic is User Datagram Protocol (UDP) based. Even though there are advantages in using this deployment mode from a signaling scale perspective (e.g., reduce the number of SCTP associations on MME, improved paging optimizations, and representing a single eNB regardless of the number of HeNBs in the network), the gain in optimization from data perspective can be further improved.

In the embodiment shown in FIG. 6, the UE traffic bypasses the FemtoGW 605 and instead passes to the SGW 610. In this way, the SGW 610 can home all or a subset of HeNBs 615. Optionally, additional enhancements are made in the SGW 610 to increase the UDP/IP context as well as scaling of GPRS Tunneling Protocol user data (GTP-U) echo messages to enable an increase in the number of HeNB homed. Meanwhile, the FemtoGW 605 continues to remain in the control path to the MME 620.

It is envisioned that the FemtoGW 605 can be removed from the control path in certain implementations by enabling the MME 620 to scale SCTP associations. However, certain embodiments retain the FemtoGW 605 in the administrative path if the FemtoGW 605 has proprietary mechanisms to communicate with HeNBs to control the administration and installation of those HeNBs. To be clear, implementations with and without the FemtoGW in the control path are within the scope of the invention.

Figure 7:
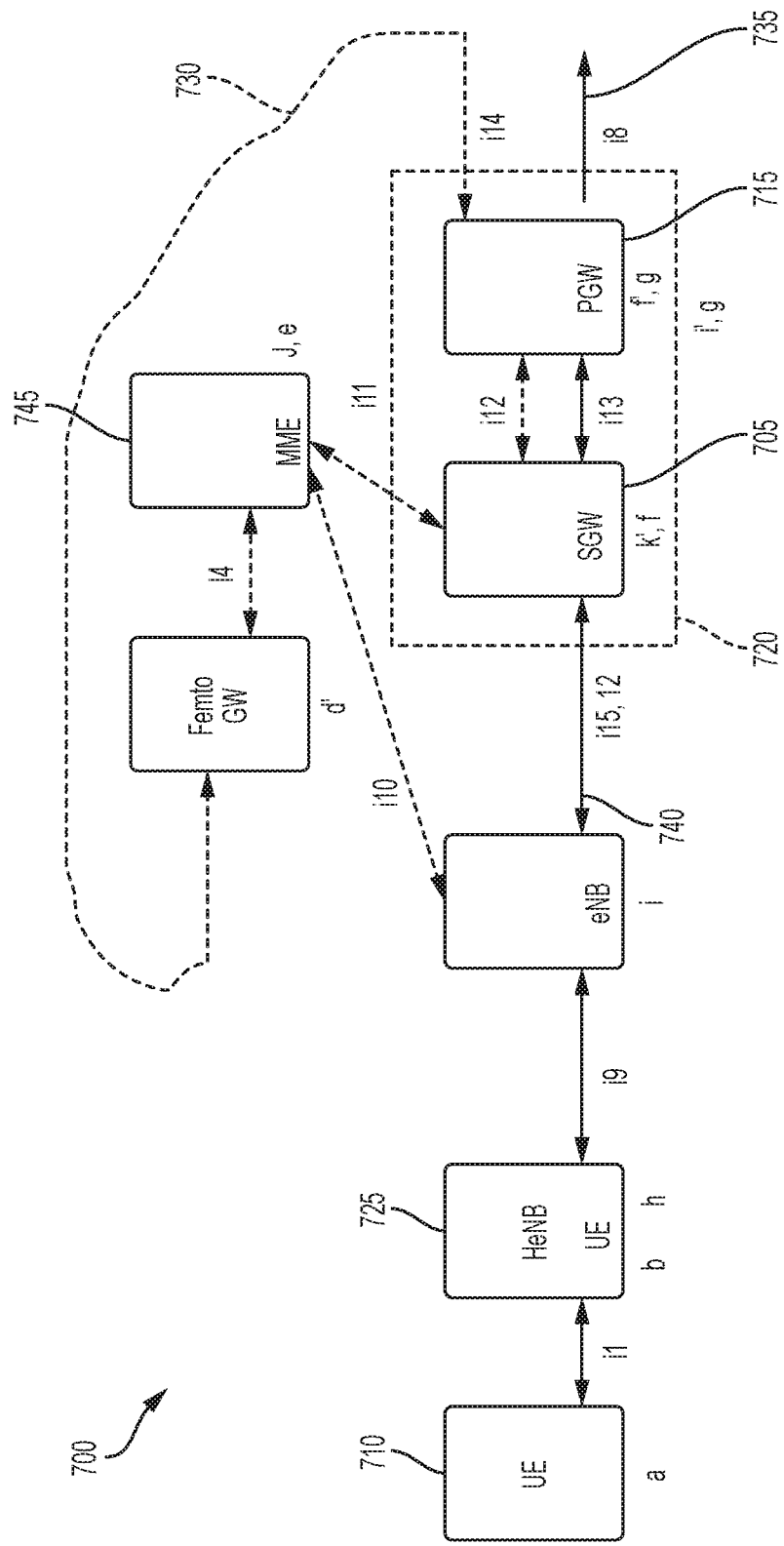
FIG. 7 shows a further embodiment of an improved femtocell implementation using a cellular backhaul according to an aspect of the invention.

FIG. 7 shows a further embodiment of an improved femtocell implementation using a cellular backhaul 700. In implementation 700, a new SGW(k', f) 705 performs all of the packet processing on uplink data traffic from UE 710 that would otherwise be performed in separate SGW(k) 630, PGW(1) 625, and SGW(f) 610 of FIG. 6. Similarly, a new PGW(1', g) 715 performs all of the packet processing on downlink data traffic to UE-c 710 that would otherwise be performed in separate PGW(g) 635, SGW(f) 610, and PGW (1) 625 of FIG. 6. In an alternative implementation, a separate SGW(k) 630 can be maintained apart from the aggregated PGW(1) 625 and SGW(f) 610. Implementations of the design above can optionally include an MME(j, e) 745 that performs the functionality of MME(e) 620 and MME(j) 640 of FIG. 6.

Implementations of the design above are accomplished by exchanging proprietary IE exchanges/extensions on GTP-C between the SGW and PGW entities, consulting the GTP-echo tables in SAE-GW (for both the SGW and the PGW operations) and setting appropriate data structures and tables to make such processing possible on the PGW. Although SGW(k', f) 705 and PGW(1', g) 715 are shown as two instances in FIG. 7 for clarity, from the data plane perspective, the entire packet processing is optimized and occurs at only one instance 720 whenever any of SGW (k', f) or PGW (1', g) are involved.

Preferred embodiments of implementation 700 have the following features. HeNB 725 is mainly dedicated to serving femto traffic for, e.g., LTE UEs (UE-f) and is capable of supporting 1 unique Access Point Name (APN) (e.g., apn-relay) for it to signify to the core network that this traffic stream is for an LTE relay function. Additional APNs can be available if the HeNB 725 was to also act as Customer Premise Equipment (CPE) for browse traffic. All traffic originating from HeNB 725 (including management traffic and control traffic) or traffic for UEs 710 connected to HeNB 725 over the cellular backhaul will use the unique relay APN. Meanwhile, traffic using the unique APN will be tunneled using Generic Routing Encapsulation (GRE), such that uplink traffic uses an "apn-relay" IP address as the source address and copies the destination address into the GRE destination address. All downlink traffic is processed by HeNB 725 in the reverse manner, e.g., if the destination IP address matches the "apn-relay" IP address, the IP header is stripped, and the GTP packet is processed.

Meanwhile, uplink traffic (e.g., signaling, management, and/or data) through the HeNB 725 is used to map the Femto-UE 710 IP address to the femto network via the HeNB 725. Until that occurs, the uplink packet processing path on SGW(k) (as part of 705) can proceed in the typical manner. As the network entities are aware if PGW(1) (as part of 715) is in the same cluster at SGW(k) (as part of 705), the packet processing of PGW(1) (as part of 715) will occur immediately when able.

Further optional enhancements can be made in embodiments of implementation 700 by optimizing the uplink packet processing path on PGW(1) (as part of 715) as follows. First, the GTP header of an incoming packet is unpacked. Packets arriving at a non-apn-relay APN are processed in the typical fashion. In contrast, packets arriving at an apn-relay APN have their IP header stripped, and the source IP address (this is UE-f) is saved. If the inner packet is a non-GTP-U packet, then the packet is forwarded in the typical fashion. For example, the packet could be SCTP or administrative traffic from the HeNB to be forwarded to a FemtoGW, if present, or directly to an MME. Such a packet is forwarded normally. If the inner packet is a GTP-U packet, the source IP address is checked to confirm that the address is a valid GTP-U peer for the SGW (e.g., SGW(f)), and if so, the UE-f IP address is updated to HeNB mapping, and the Tunnel Endpoint Identifier (TEID) is validated. At this point, typical SGW packet processing takes place as would have taken place on SGW(f) 610 of FIG. 6, and the packet is forwarded to the internal instance of PGW(g) (as part of 715) for typical processing as defined by standards. Finally, the source IP address is checked to confirm it is a valid allocated PDN session.

Similarly, other optional enhancements can be made in embodiments of implementation 700 by optimizing the downlink packet processing path on PGW(g) (as part of 715) as follows. A packet arriving on il4 730 or i8 735 will be an IP packet, which if being served by HeNB(b) 725, needs to be encapsulated with a GTP header twice as it traverses il5 740. Such an IP packet will provide appropriate service treatment (e.g., QoS, charging, etc.) and PGW(g) will encapsulate the incoming packet with a GTP-U header. Next, the GTP-U packet credentials will be checked to confirm GTP-U validation on SGW(f) (as part of 705) with the HeNB(b) 725 as its GTP-peer. The GTP-U header will then be transformed with an updated GTP-U header to be processed. Before forwarding the packet downstream, the SGW (f) (as part of 705) checks that the destination IP address in the GTP-U packet is a valid GTP-peer. For example, to confirm the HeNB 725 is a peer with SGW(f) (as part of 705), the SGW(f) (as part of 705) checks if there is a UE-f associated with the GTP-peer. If so, a null key GRE header with the UE-f IP address set as the destination address and a source address set from the GTP header is provided and the packet is forwarded to PGW(1) (as part of 715) for typical processing. Packet processing at SGW(k) (as part of 705) is also typical packet processing.

As shown and described herein, illustrative implementation 700 includes one or more of nodes 705, 715, and/or 720 that behave as hybrid gateway nodes by performing the functions and processing of one or more of a PGW and/or SGW. Moreover, the PGW and/or SGW functionality performed by a hybrid node can be that of (i) the PGW and/or SGW that would otherwise be included in the cellular backhaul (i.e., where the PGW and SGW functionality is provided for the femtocell acting as the UE) and/or (ii) the PGW and/or SGW outside of the backhaul portion of the architecture (i.e., where the PGW and SGW functionality is provided for the end-user UE attached to the femtocell). These nodes communicate with other system and network elements, e.g., eNodeBs, packet data network servers, etc. via digital communication interfaces. For example, known network interface hardware is used to interconnect the required elements.

Figure 8:
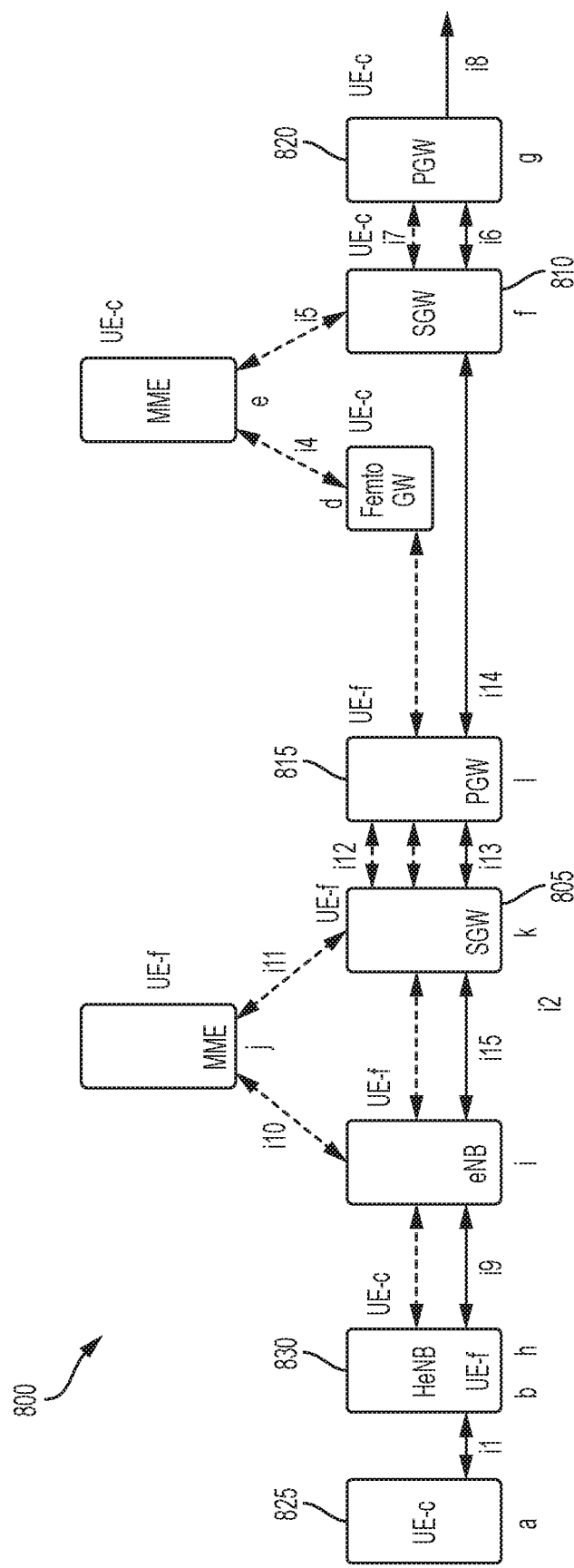
FIG. 8 illustrates a further improved femtocell implementation using a cellular backhaul according to an aspect of the invention.

FIG. 8 illustrates a further improved femtocell implementation using a cellular backhaul 800. In some implementations described above, the SGWs and PGWs (including multiple instances of these entities) interact using the standard signaling messages as defined by 3GPP over S11/S5-S8 interfaces. In other words, there is no modification to any messages when SGW and/or PGW interact either in the control path or data path. However, in implementation 800, when the SGW(k) 805 and/or SGW(f) 810 interact with PGW(1) 815 and/or PGW(g) 820 over the control path, additional information elements are exchanged to transfer knowledge about the state of a given subscriber. This information exchange facilitates maintenance of various tables to optimize the packet processing to avoid the multiple hop problem as well as reducing the overall latency in the user path.

Further still, in certain implementations that have more than one SAE-GW (e.g., SGW+PGW) the UE-f context may be hosted on a separate SAE-GW than the UE-c context. For example, SGW(k) 805 and PGW(1) 815 may be on a separate SAE-GW than SGW(f) 810 and PGW(g) 820. The above embodiments can be further enhanced to reduce the negative impacts of the double hop problem by migrating the sessions from SGW(f) 810 and PGW(g) 820 to PGW(1) 815 for the duration of UE 825 connectivity to HeNB 830. In this further optional aspect, PGW(g) 820 and PGW(1) 815 have equivalent network reachability (i.e., the same outside connection) for both S5/S8 interfaces, Authentication, Authorization, and Accounting (AAA) messaging, and SGi side interface. Also, there is a special AN-GTP connectivity between the various SAE-GW elements to exchange various GTP-variant messages.

This optional aspect enables knowledge of all HeNB entities and UE-f context knowledge at all SAE-GWs though the special AN-GTP interface such that all SGWs and PGWs have knowledge of each other with respect to reachability information. On this special AN-GTP interface, there are at least two kinds of information exchanges: (1) link information exchange, which advertises the GTP-peering information across all SAE-GWs in the operator network and (2) subscriber information exchange, which advertises subscriber information to help facilitate session transfer to avoid the double hop problem.

As set forth in more detail above, embodiments of the invention include an implementation of a femtocell (e.g., a 3G or LTE femtocell) with cellular backhaul in which the SeGW node typically present in a prior art femtocell implementation is removed. Embodiments of the invention also include implementations in which the FemtoGW normally present in a prior art femtocell is removed from the UE traffic path. Further still, embodiments include implementations in which the SGW and/or the PGW nodes present in the backhaul of a prior art femtocell is eliminated and the functionality of the eliminated nodes are performed by the SGW and/or PGW existing outside the backhaul.

The techniques and systems disclosed herein may be implemented as a computer program product for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Moreover, the techniques and systems disclosed herein can be used with a variety of mobile devices. For example, mobile telephones, smart phones, personal digital assistants, and/or mobile computing devices capable of receiving the signals discussed herein can be used in implementations of the invention.

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein. The scope of the invention is as set forth in the appended claims and equivalents thereof, rather than being limited to the examples contained in the foregoing description.

What is claimed is:

1. A system for one or more mobile wireless devices to communicate with a data network via a small cell radio access network, the small cell radio access network using a cellular backhaul configured to transmit data of the one or more mobile wireless devices to a cellular network, wherein the cellular backhaul used by the small cell radio access network is the same as the cellular network, the system comprising:
    a first digital communication interface for communicating with an Evolved Node B (eNodeB) element of the small cell radio access network, wherein the eNodeB element receives uplink data traffic from the one or more mobile wireless devices through a home eNode B (HeNB) element of the small cell radio access network;
    a second digital communication interface for communicating with a packet data network; and
    a hybrid gateway node communicating with the eNodeB element via the first digital communication interface and the hybrid gateway node communicating with the packet data network via the second digital communication interface, the hybrid gateway node including a serving gateway (SGW) element and a packet data network gateway (PGW) element, the hybrid gateway node receiving the uplink data traffic from the one or more mobile wireless devices through the first digital communication interface, the hybrid gateway node further including a processor and memory configured to:
    during an uplink:
        perform, by the hybrid gateway node, PGW element processing on data received from the eNodeB; and
        perform, by the hybrid gateway node, at least a portion of PGW element processing before performing at least a portion of SGW element processing on data received from the eNodeB, wherein the at least a portion of PGW element processing is a backhaul packet data network gateway functionality and the at least a portion of SGW element processing is a serving gateway functionality; and
    during a downlink:
        perform, by the hybrid gateway node, at least a portion of SGW element processing before performing at least a portion of PGW element processing on data received from the packet data network, wherein the at least a portion of SGW element processing is a serving gateway functionality and the at least a portion of PGW element processing is a backhaul packet data network gateway functionality,
        thereby providing a backhaul serving gateway functionality, a backhaul packet data network gateway functionality, a serving gateway functionality, and a packet data network gateway functionality to the one or more mobile wireless devices and the HeNB element in a single node in the system.

2. The system of claim 1, wherein the first digital communication interface and the second digital communication interface are different interfaces.

3. The system of claim 1, further comprising a Mobility Management Entity (MME) in communication with the hybrid gateway node.

4. The system of claim 3, the MME being a hybrid MME that includes a second processor and second memory configured to transmit:
    a signal related to mobility and security for E-UTRAN access; and backhaul data within the small cell radio access network.

5. The system of claim 4, wherein the second processor and the second memory of the hybrid MME are configured to scale Stream Control Transmission Protocol associations.

6. The system of claim 1, further comprising a femto gateway node that exists outside a user equipment traffic path of the small cell radio access network while remaining in a control traffic path of the small cell radio access network.

7. A method of conveying data in a data network via a small cell radio access network, the small cell radio access network using a cellular backhaul that provides access from a cellular network, wherein the cellular backhaul used by the small cell radio access network is the same as the cellular network, the method comprising:
    receiving data from a packet data network;
    processing the data by a hybrid gateway node in accordance with a packet data network gateway functionality for a mobile device in communication with an Evolved Node B (eNodeB) element of the small cell radio access network, wherein the mobile device is in communication with the eNodeB element through a home eNode B (HeNB) element of the small cell radio access network, the hybrid gateway node including a serving gateway (SGW) element and a packet data network gateway (PGW) element;
    processing the data by the hybrid gateway node in accordance with a backhaul serving gateway functionality for the HeNB element, wherein processing the data in accordance with a packet data network gateway functionality and in accordance with a backhaul serving gateway functionality comprises performing packet data network gateway functionality and serving gateway functionality for the mobile device before performing backhaul packet data network gateway functionality for the HeNB element; and
    transmitting the processed data to the eNodeB element of the small cell radio access network.

8. The method of claim 7, further comprising exchanging control data between the hybrid gateway node and a Mobility Management Entity (MME) node.

9. The method of claim 8, wherein the MME is a hybrid MME, and wherein the method further comprises the hybrid MME:
  processing the control data in accordance with a backhaul MME functionality; and
  processing the control data in accordance with a MME functionality for the mobile device communicating with the eNodeB element.

10. The method of claim 9, further comprising the hybrid MME scaling Stream Control Transmission Protocol associations.

11. The method of claim 7, further comprising routing control traffic to a femto gateway node for processing while bypassing the femto gateway node with user equipment traffic.

12. A non-transitory computer-readable medium that enables data in a data network to be conveyed via a small cell radio access network, the small cell radio access network using a cellular backhaul that provides access from a cellular network, wherein the cellular backhaul used by the small cell radio access network is the same as the cellular network, and wherein the computer-readable medium comprises instructions that are executable by one or more processors to cause a computing system to:
  receive data from a packet data network;
  process the data by a hybrid gateway node in accordance with a packet data network gateway functionality for a mobile device in communication with an Evolved Node B (eNodeB) element of the small cell radio access network, wherein the mobile device is in communication with the eNodeB element through a home eNode B (HeNB) element of the small cell radio access network, the hybrid gateway node including a serving gateway (SGW) element and a packet data network gateway (PGW) element;
  process the data by the hybrid gateway node in accordance with a backhaul serving gateway functionality for the HeNB element, wherein processing the data in accordance with a packet data network gateway functionality and in accordance with a backhaul serving gateway functionality comprises performing packet data network gateway functionality and serving gateway functionality for the mobile device before performing backhaul packet data network gateway functionality for the HeNB element; and
  transmit the processed data to the eNodeB element of the small cell radio access network.

13. The non-transitory computer-readable medium of claim 12, further comprising additional instructions that are executable by the one or more processors to exchange control data between the hybrid gateway node and a Mobility Management Entity (MME) node.

14. The non-transitory computer-readable medium of claim 13, wherein the MME is a hybrid MME, and wherein the hybrid MME:
  processes the control data in accordance with a backhaul MME functionality; and
  processes the control data in accordance with an MME functionality for the mobile device communicating with the eNodeB element.

15. The non-transitory computer-readable medium of claim 14, wherein the hybrid MME is configured to scale Stream Control Transmission Protocol associations.

16. The non-transitory computer-readable medium of claim 12, further comprising additional instructions that are executable by the one or more processors to route control traffic to a femto gateway node for processing while bypassing the femto gateway node with user equipment traffic.

* * * * *